United States Patent
Heuer et al.

(10) Patent No.: US 11,584,514 B2
(45) Date of Patent: Feb. 21, 2023

(54) AIRFOIL FOR FLOW CONTROL INCLUDING A COMMON INLET/OUTLET DEVICE CONNECTED TO A POROUS SECTION

(71) Applicant: AIRBUS OPERATIONS GMBH, Hamburg (DE)

(72) Inventors: Thomas Heuer, Hamburg (DE); Volker Piezunka, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 237 days.

(21) Appl. No.: 16/966,353

(22) PCT Filed: Jan. 23, 2019

(86) PCT No.: PCT/EP2019/051599
§ 371 (c)(1),
(2) Date: Jul. 30, 2020

(87) PCT Pub. No.: WO2019/149590
PCT Pub. Date: Aug. 8, 2019

(65) Prior Publication Data
US 2020/0369376 A1    Nov. 26, 2020

(30) Foreign Application Priority Data
Jan. 31, 2018  (DE) .................... 10 2018 102 174.7

(51) Int. Cl.
*B64C 21/08*    (2006.01)
*B64C 21/02*    (2006.01)
(Continued)

(52) U.S. Cl.
CPC .............. *B64C 21/08* (2013.01); *B64C 21/02* (2013.01); *B64C 21/04* (2013.01); *B64C 21/06* (2013.01)

(58) Field of Classification Search
CPC ......... B64C 21/02; B64C 21/04; B64C 21/06; B64C 21/08
(Continued)

(56) References Cited

U.S. PATENT DOCUMENTS 1,810,693 A * 6/1931 Heraclio ............... B64C 21/025
244/211
3,149,805 A * 9/1964 Frey .................... B64C 29/0041
244/208

(Continued)

FOREIGN PATENT DOCUMENTS

EP    2 208 669    7/2010
EP    2 853 485    4/2015
(Continued)

OTHER PUBLICATIONS

German Search Report for DE Application No. 10 2018 102 174.7 dated Oct. 26, 2018, 9 pages.
(Continued)

*Primary Examiner* — Brady W Frazier
(74) *Attorney, Agent, or Firm* — Nixon & Vanderhye P.C.

(57) ABSTRACT

An airfoil for flow control is disclosed having an outer skin in contact with an ambient air flow, wherein the outer skin extends between a leading edge and a trailing edge with two opposite lateral sides, and surrounds an interior space. The outer skin comprises a porous section in the area of the leading edge, a pressure chamber arranged in the interior space and fluidly connected to the porous section, an air inlet fluidly connected to the pressure chamber, and an air outlet fluidly connected to the pressure chamber.

13 Claims, 2 Drawing Sheets

Figure 1:
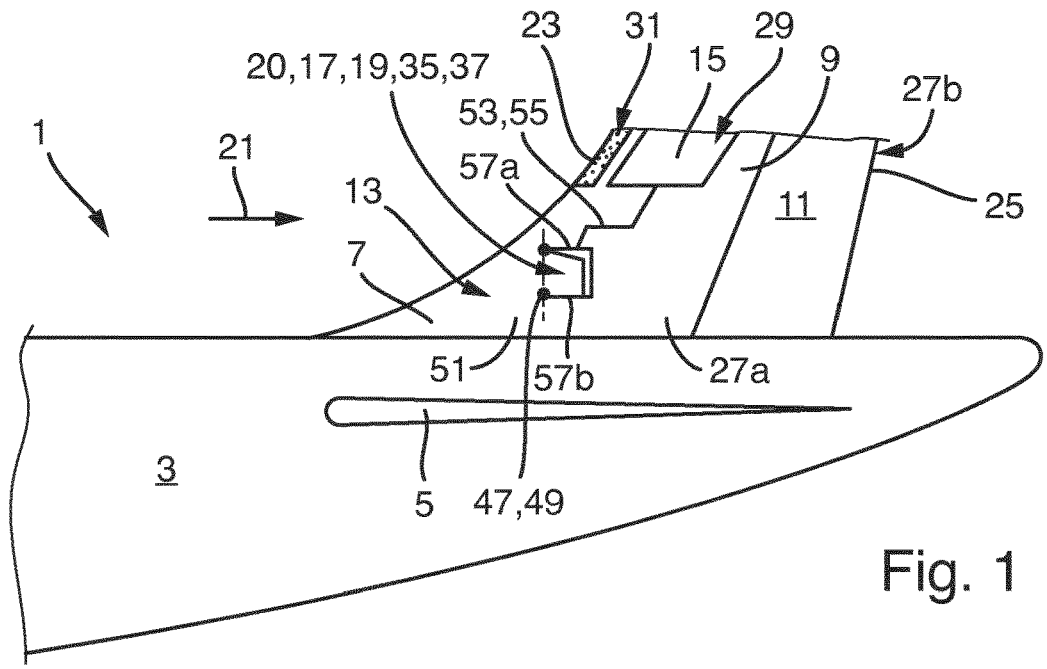

(51) Int. Cl.
  *B64C 21/04* (2006.01)
  *B64C 21/06* (2006.01)
(58) Field of Classification Search
  USPC .......................................................... 244/208
  See application file for complete search history.

(56) References Cited

U.S. PATENT DOCUMENTS

| | | | | |
|---|---|---|---|---|
| 3,921,942 A | * | 11/1975 | Bracka | B64C 21/025 244/87 |
| 4,418,879 A | * | 12/1983 | Vanderleest | B64D 33/02 137/15.1 |
| 4,836,473 A | * | 6/1989 | Aulehla | B64C 21/00 244/130 |
| 6,349,899 B1 | * | 2/2002 | Ralston | B64D 33/02 244/53 B |
| 8,245,976 B2 | * | 8/2012 | Sakurai | B64C 21/08 244/58 |
| 8,484,894 B2 | * | 7/2013 | Sakurai | B64C 21/02 49/73.1 |
| 8,915,776 B2 | * | 12/2014 | Heuer | B64D 13/00 454/71 |
| 10,252,811 B2 | * | 4/2019 | Bell | F02C 7/05 |
| 2006/0102776 A1 | * | 5/2006 | Hein | B64D 41/00 244/10 |
| 2012/0280088 A1 | * | 11/2012 | Sakurai | B64C 21/08 49/506 |

FOREIGN PATENT DOCUMENTS

| | | |
|---|---|---|
| EP | 2 886 453 | 6/2015 |
| WO | 2005/113336 | 12/2005 |

OTHER PUBLICATIONS

International Search Report and Written Opinion of the ISA for PCT/EP2019/051599 dated Apr. 12, 2019, 14 pages.

\* cited by examiner

AIRFOIL FOR FLOW CONTROL INCLUDING A COMMON INLET/OUTLET DEVICE CONNECTED TO A POROUS SECTION

CROSS REFERENCE TO RELATED APPLICATIONS

The present application is a National Phase of International Application Number PCT/EP2019/051599 filed Jan. 23, 2019, which designated the U.S. and claims priority benefits from German Patent Application Number DE 10 2018 102 174.7 filed Jan. 31, 2018, the entire contents of each of which are hereby incorporated by reference.

The present invention relates to an airfoil for an aircraft. The airfoil preferably is a vertical tail unit but might also be a wing or a horizontal tail unit. The airfoil is configured for flow control, preferably for hybrid laminar flow control. A further aspect of the present invention relates to an aircraft comprising such an airfoil.

The airfoil comprises an outer skin, a pressure chamber, an air inlet, and an air outlet. Preferably, the airfoil further comprises a plurality of structural parts, such as stiffeners, for supporting the outer skin from the inside. In the case of a vertical tail unit it is preferred that the airfoil is composed of a vertical stabilizer and a rudder pivotally mounted to the vertical stabilizer.

The outer skin is in contact with an ambient air flow and extends between a leading edge facing the incoming flow, and a trailing edge. Further, the outer skin has two opposite lateral sides and surrounds an interior space. The outer skin further comprises a porous section in the area of the leading edge for letting air through the outer skin. The porous section might be formed e.g. as a perforated skin panel or as a skin panel made from a porous material.

The pressure chamber is arranged in the interior space for holding an overpressure or an underpressure with respect to the pressure of the ambient air flow in front of the porous section. The pressure chamber is fluidly connected to the porous section.

The air inlet is provided in the outer skin for letting in air from the ambient air flow. The air inlet is fluidly connected to the pressure chamber and configured to cause, in flight of the associated aircraft, an overpressure in the pressure chamber, such that air from the pressure chamber discharges through the porous section to the ambient air flow.

The air outlet is provided in the outer skin for letting out air into the ambient air flow. The air outlet is fluidly connected to the pressure chamber and configured to cause, in flight of the associated aircraft, an underpressure in the pressure chamber such that air from the ambient air flow is sucked in through the porous section into the pressure chamber. Preferably, the air outlet is formed as a movable flap that is or can be opened in the direction of the trailing edge.

Such airfoils are known in the art. The air inlet of the known airfoils is often formed as an air scoop that projects out of the outer skin into the ambient air flow. However, such an air scoop causes additional drag at the airfoil and decreases efficiency. Further, the air inlet and the air outlet are usually formed separately and provided at separate positions in the outer skin, which is complicated and space consuming.

Therefore, the object of the present invention is to provide a simple and compact airfoil with reduced drag an increased efficiency.

This object is achieved in that the air inlet and the air outlet are integrated in or formed as a common, hybrid inlet/outlet device that is arranged in one lateral side of the outer skin, preferably such that the air inlet and the air outlet share common walls. The inlet/outlet device is configured to selectively a) let air from the ambient air flow through the air inlet into the airfoil, or b) discharge air from inside the airfoil through the air outlet into the ambient air flow. In such a way, the inlet/outlet device combines the functions of the air inlet and the air outlet, and can be operated either as air inlet or as air outlet. This means, heavy and spacious mechanical parts as well as complicated sealing do not need to be provided redundantly for separate air inlet and air outlet, thereby reducing complexity, space and weight of the airfoil.

Further, the air inlet is formed as an opening that is arranged in one lateral side of the outer skin and that is flush with the outer skin, in particular with the outer mold line. The opening might be formed as a hole in the outer skin with a channel following to the inside of the airfoil. In such a way, no parts of the air inlet project out from the outer skin into the ambient air flow so that no additional drag is caused by the air inlet or at least the additional drag is minimized. Preferably, the air outlet includes a pivotable flap that can be opened in the direction of the trailing edge, so that an outlet opening faces to the trailing edge. Such a trailing edge facing flap is able to cause an underpressure in the pressure chamber, so that air is sucked in through the pores.

According to a preferred embodiment, the air inlet comprises an inward-pivoting door. The door can be pivoted between a closed position, where the door is aligned with the outer skin and where an ambient air flow is inhibited from passing through the outer skin and entering the airfoil, and an inlet position where the ambient air flow may pass through the outer skin into the airfoil. In the closed position the door is flush with the outer skin, and in the inlet position a channel is formed between the door and an edge of the opening, for ambient air flow to pass through the outer skin into the airfoil. Preferably, the channel points to the leading edge. By such an inward-pivoting door the air inlet can be opened and closed without projecting out of the outer skin into the ambient air flow.

In particular, it is preferred that the door is mounted to the airfoil by a first hinge. The first hinge is arranged at that side of the door facing the leading edge, so that the channel opens in the direction of the leading edge. Preferably, specifically in the case of a vertical tail unit, the first hinge has a vertical first hinge axis. However, in case of a wing or a horizontal tail unit the first hinge preferably has a horizontal first hinge axis that extends transverse to a flight direction. In such a way, air of the ambient air flow can flow into the channel without being deflected.

According to a preferred embodiment, the door comprises a second hinge pivotally connecting a first door portion to a second door portion. The first door portion extends from the first hinge to the second hinge. The second door portion extends from the second hinge to a free end of the door that lies adjacent to or in contact with the edge of the opening in the closed position of the door. Preferably, specifically in the case of a vertical tail unit, the second hinge has a vertical second hinge axis that is spaced in parallel from the first hinge axis. However, in case of a wing or a horizontal tail unit the second hinge preferably has a horizontal second hinge axis that extends transverse to a flight direction, and that is spaced in parallel from the first hinge axis. Preferably, the air outlet is formed by the second door portion being pivotable relative to the first door portion out of the closed position of the entire door. Specifically, the second door portion is movable between the closed position of the door where first and second door portions are aligned with the outer skin and where air is inhibited from passing through the outer skin to or from the ambient air flow, and an outlet position where only the second door portion is pivoted relative to the first door portion about the second hinge outwards into the ambient air flow, to form the pivotable flap, with a trailing edge facing outlet opening between the outer skin and the free end of the second door portion. In such a way, in the outlet position air from inside the airfoil may pass through the outlet opening through the outer skin to the ambient air flow. I.e., the second door portion is pivoted outwards while the first door portion is still aligned with the outer skin as in the closed position. Such an arrangement with first and second hinges provides a flexible and efficient inlet/outlet device design.

According to an alternative embodiment, the air outlet is formed by the door being pivotable about the first hinge outwards into the ambient air flow to form the pivotable flap with a trailing edge facing outlet opening between the outer skin and the door, so that air from inside the airfoil may pass through the outlet opening through the outer skin to the ambient air flow. I.e., in this embodiment the entire door is pivoted outwards. This represents a particularly simple design of the inlet/outlet device.

According to a further preferred embodiment, the inlet/outlet device has two opposite side walls between which the door moves when pivoting between the inlet position and the closed position. The side walls proceed in a diverging manner with respect to one another in a direction from the leading edge to the trailing edge, i.e. along the channel from the first hinge to the inlet duct. In particular, it is preferred that the side walls proceed in the form of a wave in the direction from the leading edge to the trailing edge such that the distance between the side walls first increases with an increasing slope and subsequently increases with a decreasing slope. By such geometry of the side walls particularly advantageous mass flow rate and flow conditions can be obtained.

According to another preferred embodiment, the inlet/outlet device is arranged further to a root of the airfoil than the porous section. The root relates to that part of the airfoil where the airfoil is or can be connected to a fuselage. In other words, the inlet/outlet device is arranged below the porous section. In such a way, the inlet/outlet device and the porous section do not interfere one another.

According to a further preferred embodiment, the air inlet is connected to the pressure chamber via an inlet duct. Preferably, the inlet duct proceeds from the air inlet upwards to the pressure chamber.

In particular, it is preferred that the air outlet is connected to the pressure chamber via an outlet duct. Preferably, at least parts of, e.g. all of, the inlet duct and the outlet ducts are formed integrally. In such a way, a minimum amount of structure and thus weight is required.

A further aspect of the present invention relates to an aircraft comprising a airfoil according to any of the above described embodiments. The features and advantages mentioned above in connection with the airfoil also apply for the aircraft.

Hereinafter, preferred embodiments of the present invention are described in more detail by means of a drawing. The drawing shows in FIG. 1 a side view of the tail section of an aircraft according to the invention, FIG. 2 a detailed cross sectional view of an inlet/outlet device of the aircraft shown in FIG. 1 with a door in an inlet position, FIG. 3 the inlet/outlet device from FIG. 2 with the door in a closed position, FIG. 4 the inlet/outlet device from FIG. 2 with the door in an outlet position, FIG. 5 a perspective view of the inlet/outlet device shown in FIG. 2 with the door in the inlet position, FIG. 6 a perspective view of the inlet/outlet device shown in FIG. 4 with the door in the outlet position, and FIG. 7 a detailed perspective view of a further embodiment of the inlet/outlet device shown in FIG. 2 with the door in the inlet position.

In FIG. 1 an embodiment of an aircraft 1 according to the invention is illustrated. The aircraft 1 comprises a fuselage 3, a horizontal tail unit 5, and an airfoil 7 according to an embodiment of the invention. In the present embodiment the airfoil 7 is in the form of a vertical tail unit and comprises a vertical stabilizer 9 and a rudder 11 pivotally mounted to the vertical stabilizer 9. The airfoil 7 is configured for hybrid laminar flow control and comprises an outer skin 13, a pressure chamber 15, an air inlet 17, and an air outlet 19, wherein the air inlet 17 and the air outlet 19 are integrated in a common, hybrid inlet/outlet device 20.

The outer skin 13 is in contact with an ambient air flow 21 and extends between a leading edge 23 and a trailing edge 25. Further, the outer skin 13 has two opposite lateral sides 27a, 27b and surrounds an interior space 29. The outer skin 13 further comprises a porous section 31 in the area of the leading edge 23 for letting air through the outer skin 13.

The pressure chamber 15 is arranged in the interior space 29 for holding an overpressure or an underpressure with respect to the pressure of the ambient air flow 21 in front of the porous section 31. The pressure chamber 15 is fluidly connected to the porous section 31.

The inlet/outlet device 20 is arranged in one lateral side 27a of the outer skin 13 and includes both the air inlet 17 and the air outlet 19, so that it is configured to selectively let air in from the ambient air flow 21 or discharge air into the ambient air flow 21. Specifically, the air outlet 19 is configured for letting out air into the ambient air flow 21. Further, the air outlet 19 is fluidly connected to the pressure chamber 15 and configured to cause, in flight of the associated aircraft 1, an underpressure in the pressure chamber 15 such that air from the ambient air flow 21 is sucked in through the porous section 31 into the pressure chamber 15. The air inlet 17 is configured for letting air from the ambient air flow 21 into the airfoil 7. The air inlet 17 is fluidly connected to the pressure chamber 15 and configured to cause, in flight of the associated aircraft 1, an overpressure in the pressure chamber 15, such that air from the pressure chamber 15 discharges through the porous section 31 to the ambient air flow 21. The air inlet 17 is formed as an opening 35 that is arranged in one lateral side 27a of the outer skin 13 and that is flush with the outer skin 13.

Figure 2:
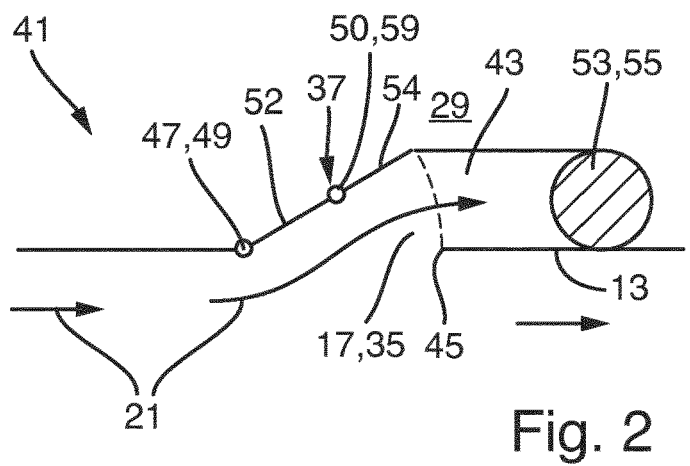
Figure 3:
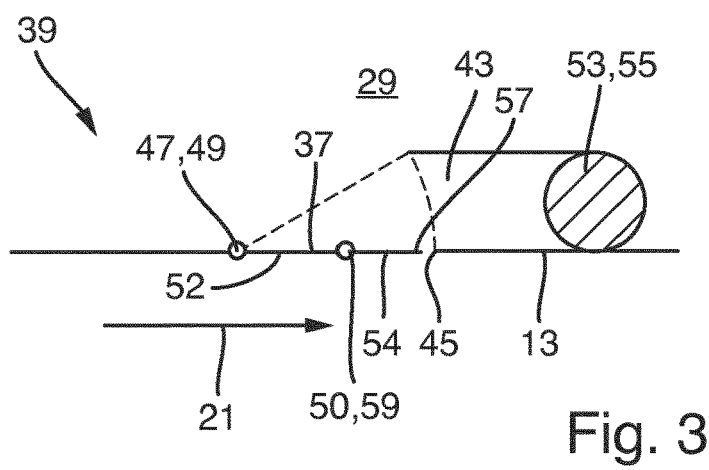
Figure 5:
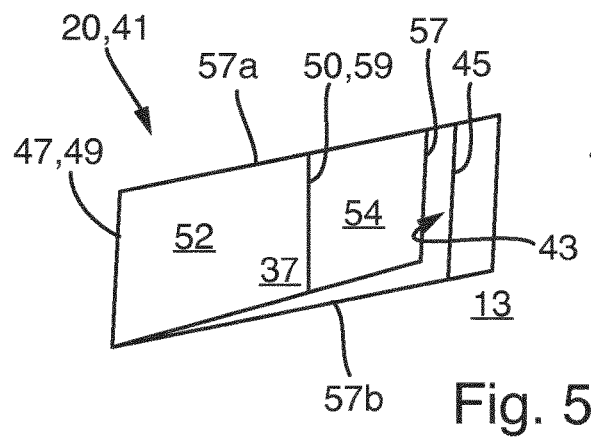

As shown in FIGS. 2, 3 and 5, the air inlet 17 is formed by the inlet/outlet device 20 comprising an inward-pivoting door 37 that can be pivoted between a closed position 39 (FIG. 3) where an ambient air flow 21 is inhibited from passing through the outer skin 13 into or out of the airfoil 7, and an inlet position 41 (FIGS. 2 and 5) where the ambient air flow 21 may pass through the outer skin 13 into the airfoil 7. In the closed position 39 the door 37 is flush with the outer skin 13, and in the inlet position 41 a channel 43 is formed between the door 37 and an edge 45 of the opening 35, for ambient air flow 21 to pass through the outer skin 13 into the airfoil 7. The door 37 is mounted to the airfoil 7 by a first hinge 47. The first hinge 47 is arranged at that side of the door 37 facing the leading edge 23, so that the channel 43 opens in the direction of the leading edge 23. The first hinge 47 has a vertical first hinge axis 49.

Figure 4:
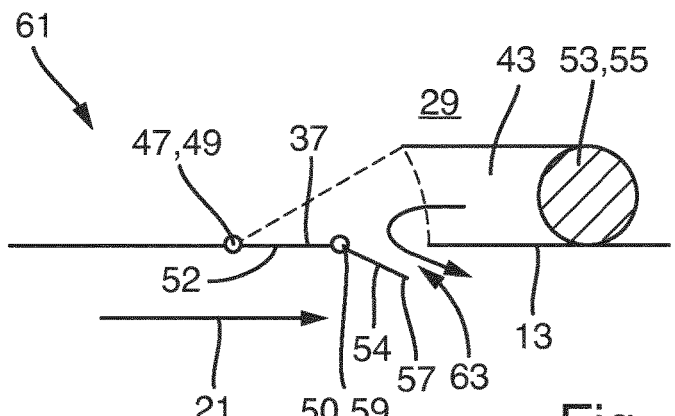
Figure 6:
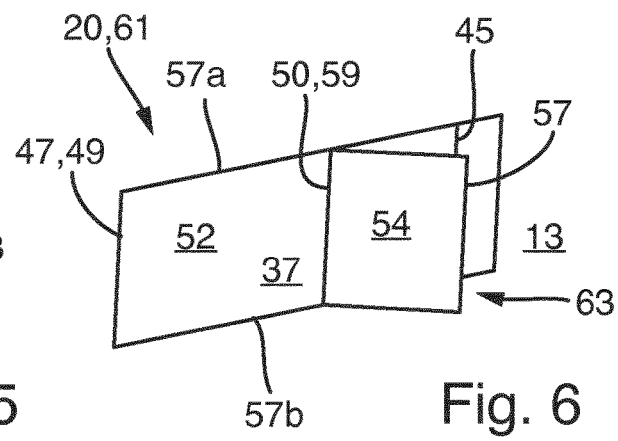

FIGS. 3, 4 and 6 illustrate the air outlet 19. The door 37 comprises a second hinge 50 pivotally connecting a first door portion 52 to a second door portion 54, wherein the first door portion 52 extends from the first hinge 47 to the second hinge 5o, and wherein the second door portion 54 extends from the second hinge 50 to a free end 57 of the door that lies adjacent to the edge 45 of the opening 35 in the closed position 39 of the door 37. The second hinge 50 has a vertical second hinge axis 59 that is spaced in parallel from the first hinge axis 49. As shown in FIGS. 4 and 6, the second door portion 54 is pivotable outwards relative to the first door portion 52 out of the closed position 39 of the door 37. This means, the second door portion 54 is movable between the closed position 39 (FIG. 3) of the door, where the first and second door portions 52, 54 are aligned with the outer skin 13 and where air is inhibited from passing through the outer skin 13 to or from the ambient air flow 21, and an outlet position 61 of the door 37 (FIGS. 4 and 6), where only the second door portion 54 is pivoted relative to the first door portion 52 about the second hinge 50 outwards into the ambient air flow 21. In such a way, a trailing edge facing outlet opening 63 is formed between the outer skin 13 and the free end 57 of the second door portion 54, so that air from inside the airfoil 7 may pass through the outlet opening 63 through the outer skin 13 to the ambient air flow 21.

As shown in FIG. 1, the inlet/outlet device 20 is arranged further to a root 51 of the airfoil 7 than the porous section 31. The air inlet 17 is connected to the pressure chamber 15 via an inlet duct 53 that proceeds from the air inlet 17 upwards to the pressure chamber 15. The air outlet 19 is connected to the pressure chamber 15 via an outlet duct 55. Wide parts of the inlet duct 53 and the outlet duct 55 are formed integrally as a common duct.

Figure 7:
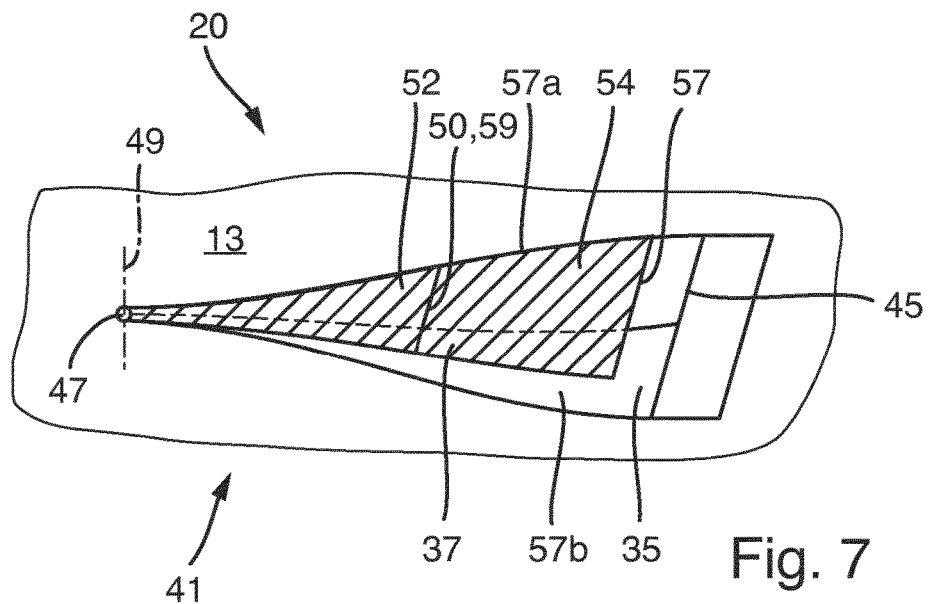

FIG. 7 shows a further embodiment of the inlet/outlet device 20 in the inlet position 41, where two opposite side walls 57a, 57b—instead of being in parallel as in the embodiment shown in FIGS. 5 and 6—proceed in a diverging manner in a direction from the leading edge 23 to the trailing edge 25. The side walls 57a, 57b proceed in the form of a wave in the direction from the leading edge 23 to the trailing edge 25 such that the distance between the side walls 57a, 57b first increases with an increasing slope and subsequently increases with a decreasing slope.

The invention claimed is:

1. An airfoil for flow control, comprising
an outer skin in contact with an ambient air flow, wherein the outer skin extends between a leading edge and a trailing edge with two opposite lateral sides, and surrounds an interior space, and wherein the outer skin comprises a porous section in the area of the leading edge,
a pressure chamber arranged in the interior space, wherein the pressure chamber is fluidly connected to the porous section,
an air inlet/outlet device provided in the outer skin, wherein the air inlet/outlet device is fluidly connected to the pressure chamber, wherein an overpressure in the pressure chamber causes the air to discharge through the porous section into the ambient air flow, and wherein an underpressure in the pressure chamber causes the air of the ambient air flow to be suctioned in through the porous section, and wherein the air the air inlet/outlet device is configured to selectively let air in from the ambient air flow or discharge air into the ambient air flow, and
wherein the air inlet/outlet device comprises an opening that is flush with the outer skin,
wherein, the air inlet/outlet device further comprises a door having a first door portion and a second door portion,
wherein the first door portion is mounted to the outer skin by a first hinge arranged on a side of the door facing the leading edge, and
wherein the first door portion is connected to the second door portion by a second hinge.

2. The airfoil according to claim 1,
wherein the door is pivotable between a closed position where the ambient air flow is inhibited from passing through the outer skin and entering the airfoil, and an inlet position where the ambient air flow may pass through the outer skin into the airfoil, and
wherein in the closed position the door is flush with the outer skin, and in the inlet position a channel is formed between the door and an edge of the opening for ambient air flow to pass through the outer skin into the airfoil.

3. The airfoil according to claim 1, wherein the first hinge has a vertical first hinge axis.

4. The airfoil according to claim 1, wherein the second hinge has a vertical second hinge axis that is spaced in parallel from the first hinge axis.

5. The airfoil according to claim 1, wherein the air outlet is formed by the second door portion being pivotable outwards relative to the first door portion out of the closed position of the door, wherein the second door portion is movable between the closed position of the door, where air is inhibited from passing through the outer ski to or from the ambient air flow, and an outlet position, where the second door portion is pivoted relative to the first door portion outwards into the ambient air flow, so that air from inside the airfoil may pass through the outer skin to the ambient air flow.

6. The airfoil according to claim 1, wherein the air outlet is formed by the door being pivotable about the first hinge outwards into the ambient air flow, so that air from inside the airfoil may pass through the outer skin to the ambient air flow.

7. The airfoil according to claim 1, wherein the inlet/outlet device has two opposite walls that proceed in a diverging manner in a direction from the leading edge to the trailing edge.

8. The airfoil according to claim 7, wherein the two opposite walls proceed in the form of a wave in the direction from the leading edge to the trailing edge such that the distance between the two opposite walls first increases with an increasing slope and subsequently increases with a decreasing slope.

9. An airfoil for flow control, comprising
an outer skin in contact with an ambient air flow, wherein the outer skin extends between a leading edge and a trailing edge with two opposite lateral sides, and surrounds an interior space, and wherein the outer skin comprises a porous section in the area of the leading edge,
a pressure chamber arranged in the interior space, wherein the pressure chamber is fluidly connected to the porous section,
an air inlet/outlet device provided in the outer skin, wherein the air inlet/outlet device is fluidly connected to the pressure chamber, wherein an overpressure in the pressure chamber causes the air to discharge through the porous section into the ambient air flow, and wherein an under pressure in the pressure chamber causes the air of the ambient air flow to be suctioned in through the porous section, and wherein the air the air inlet/outlet device is configured to selectively let air in from the ambient air flow or discharge air into the ambient air flow, wherein the air inlet/outlet device comprise an opening that is flush with the outer skin, and wherein the inlet/outlet device is arranged further to a root of the airfoil than the porous section.

10. The airfoil according to claim 1, wherein the air inlet/outlet device is connected to the pressure chamber via a duct.

11. The airfoil according to claim 9, wherein the air inlet/outlet device is connected to the pressure chamber via a duct.

12. The airfoil according to claim 11, wherein at least parts of the inlet duct and the outlet duct are formed integrally.

13. An aircraft comprising an airfoil according to claim 1.

* * * * *